(No Model.)

H. S. PERKINS, Dec'd.
M. W. Perkins, Administratrix.
GANG ROTARY SAW.

No. 435,380. Patented Aug. 26, 1890.

Witnesses
F. M. Burnham
E. M. Russell

Inventor,
Henry S. Perkins,
By his Attorney
Saml. J. Wallace,

UNITED STATES PATENT OFFICE.

HENRY S. PERKINS, OF DUNHAM, ALABAMA; MATTIE W. PERKINS ADMINISTRATRIX OF SAID HENRY S. PERKINS, DECEASED.

GANG ROTARY SAW.

SPECIFICATION forming part of Letters Patent No. 435,380, dated August 26, 1890.

Application filed March 9, 1887. Serial No. 237,584. (No model.)

*To all whom it may concern:*

Be it known that I, HENRY S. PERKINS, of Dunham, in the county of Butler and State of Alabama, a citizen of the United States, have invented a new and useful Improvement in Gang Rotary Saws, which is made and used substantially as set forth hereinafter, and as shown in the accompanying drawings, in which—

Figure 1:
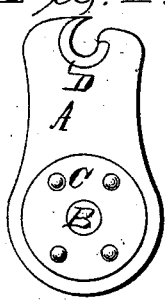
Figure 3:
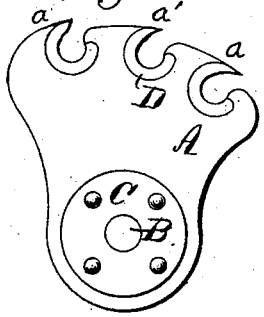
Figure 2:
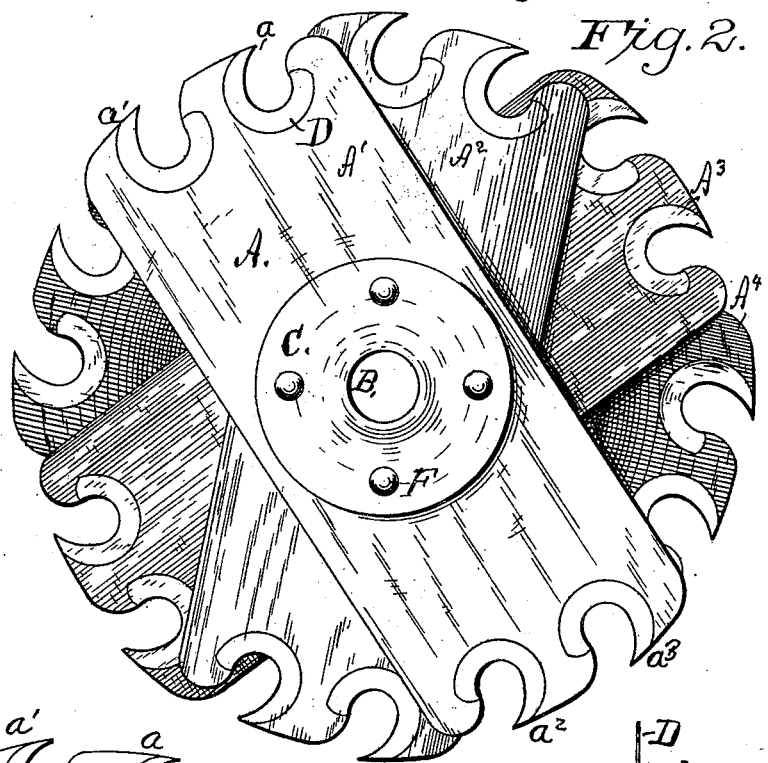
Figure 4:
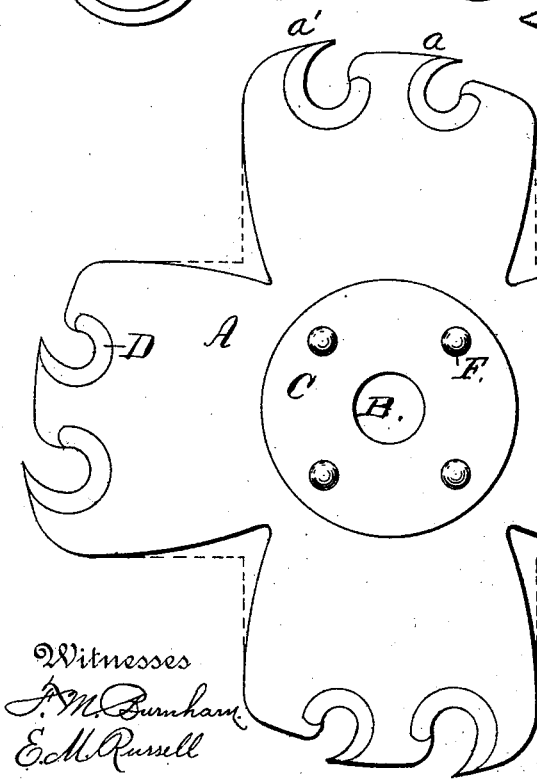
Figure 5:
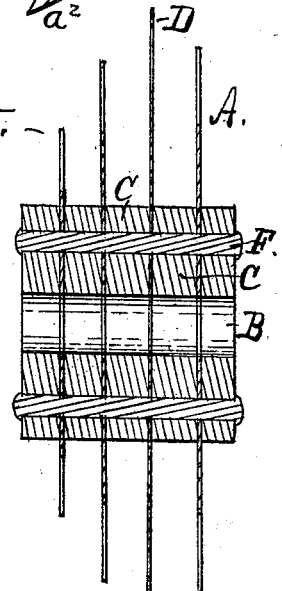

Figure 1 illustrates a saw-blade with a single tooth. Fig. 2 shows the improved gang of saws, each formed of a straight blade bearing two teeth on each end. Fig. 3 illustrates a saw with three teeth on one arm. Fig. 4 illustrates a saw with four arms bearing two teeth upon each, and Fig. 5 illustrates a section of the gang shown in Fig. 2 upon a plane at right angles to Fig. 2.

The object of this invention is to form a gang of rotary saws adapted to cut the hard Southern pine without being liable to loss of time from stoppages caused by choking up from heating and cupping by reason of the great friction in sawing such pine with gang-saws.

To this end the invention consists in a gang of flat saws, each formed of one piece, having mandrel-holes and provided with space-collars C between the saws the thickness of the boards to be cut, the saws and collars being held solidly together in the gangs by bolts F through holes in the saws and collars, and the saws being cut away on one or more of their sides to avoid cupping by heat from friction.

The invention also consists in making the saws of straight parallel-sided plates with two or more teeth on each end.

The invention further consists in making the teeth on each end of the blade with cutting-points at different distances from the axis.

It consists, further, in making a solid gang of such peculiar saws with the teeth of one saw opposite spaces having no teeth in one or more of the other saws and in various details.

The saws are made, as illustrated in Figs. 2 and 5, of single pieces of metal with flat or plane blades having parallel edges, with two teeth cut or inserted in each end having cutting-points at different distances from the axis. They have central mandrel-holes B and collars C between them the thickness of the boards to be cut, and they are held in a solid gang with the collars by the bolts F through the system of saws and collars, free of the mandrel-hole, and secured by riveting or otherwise. The saws made in this way with parallel edges are made from long plates of steel of much less width than would be required to cut round saws having the same effective diameter, and many sizes of saws are made from one size of plate with facility and little loss of material by merely cutting off different lengths and finishing them. These plates may be rolled out with a good degree of temper, and by using inserted teeth this method allows the saw to be made with a minimum of care and skill, labor, and cost without oil-tempering and hammering. The saw-blades made of parallel-sided plates with teeth on their ends may be looked upon as circular saws having large segments cut away on opposite sides, and also as if the teeth on their ends were set in like positions upon circles having no other teeth upon their peripheries, so that the teeth would appear at different distances apart around them. The teeth on one arm $a$ and $a'$ are set closer together on the circle of revolution than are the adjacent teeth on the different ends or arms, as $a$ and $a^3$ or $a'$ and $a^2$. If the teeth set thus at different distances apart around the circle of revolution had their cutting-points all at equal distances from the axis of revolution, they would cut unequal thicknesses or portions of the space fed during one revolution of the saw with uniform feed. To avoid this unequal cutting, the teeth are made with their cutting-points at different distances from their axis of revolution, to correspond with their different distances apart around the circle, so they will cut uniform portions of the distance fed. The teeth $a$ $a^2$, which have their cutting-points nearer the axis, follow the wider spaces between the teeth, and the teeth which have their cutting-points farther from the axis, as $a'$ $a^3$, follow the shorter spaces, so as to cut farther with less portions of the feed. In this way the teeth are arranged to divide the distance fed equally between them, so each will cut equal independent portions of it, however unequally they are distributed around the circle of revolution by the cutting away to avoid cupping. The saw-blades are set into a gang, as in Fig. 2, so the teeth in one saw are set opposite vacant spaces in one or more of the others, so the several saws will compensate for each other and bring the cutting-points in the gang in a relation of uniform distribution around the circle of revolution and cause a uniform strain upon the driving-mandrel and source of power.

The saw-blades may be made in many different forms, as illustrated in the different figures. These may be looked upon as circular saws with parts cut away in different ways to break the continuity of the circle and allow the remainder to expand radially in heating from friction to avoid cupping or distortion from a true normal plane and prevent the saw from choking up.

Instead of the saw-blade with two arms, as in Fig. 2, it may be made with but a single arm, the other being cut away, or, as in Figs. 1 and 3, with any suitable number of teeth therein, as illustrated; or it may be made with four arms, as in Fig. 4, or of any other suitable form.

Any suitable number of saws are mounted in the gang. Figs. 2 and 5 show four saws used, $A'$ $A^2$ $A^3$ $A^4$, and these saws are arranged together in the gang so the teeth on one blade are opposite the vacant or cut-away parts on the others.

I claim—

1. The combination of a number of flat saw-blades, each having a mandrel-hole and being cut away on one or more sides of its periphery to admit of expansion from friction without distortion with the spacing-collars C between the saws, and with bolts F holding the whole—blades and collars—solidly together.

2. A gang of rotary saws having each a mandrel-hole and a peripheral part cut away to avoid cupping, and having teeth upon the uncut portion with their cutting-points at unequal distances from the rotary axis, said gang having space-collars C between the saws, and the saws and the collars being held solidly together by bolts F.

3. A saw-blade having straight parallel sides, a central mandrel-hole, and teeth on the two ends of the blade, the teeth on one end being unequal in length from the central axis of rotation.

HENRY S. PERKINS.

Witnesses:
U. C. PIERSON,
A. N. GLENN.